(12) United States Patent
Hermann et al.

(10) Patent No.: US 8,059,007 B2
(45) Date of Patent: Nov. 15, 2011

(54) BATTERY THERMAL EVENT DETECTION SYSTEM USING A THERMALLY INTERRUPTIBLE ELECTRICAL CONDUCTOR

(75) Inventors: Weston Arthur Hermann, Palo Alto, CA (US); Daniel Nicholas Brncic, Menlo Park, CA (US); Paul Bryan Kreiner, Palo Alto, CA (US); Scott Ira Kohn, Redwood City, CA (US); Dorian West, Menlo Park, CA (US); Jonathan Louis Hall, San Mateo, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 415 days.

(21) Appl. No.: 12/455,198

(22) Filed: May 28, 2009

(65) Prior Publication Data

US 2010/0302051 A1 Dec. 2, 2010

(51) Int. Cl.
*G08B 21/00* (2006.01)
(52) U.S. Cl. ......... 340/636.11; 340/636.12; 340/636.14; 340/641; 340/643; 340/691.6; 320/150; 320/153; 320/154; 320/106; 320/134; 324/427; 324/430; 324/431

(58) Field of Classification Search ............. 340/636.11, 340/636.12, 636.14, 641, 643, 691.6; 320/106, 320/134, 150, 153, 154; 324/427, 430, 431
See application file for complete search history.

(56) References Cited

U.S. PATENT DOCUMENTS

| 6,903,534 | B2 * | 6/2005 | Minamiura | 320/150 |
| 7,155,075 | B2 * | 12/2006 | Rajendran et al. | 385/12 |

\* cited by examiner

*Primary Examiner* — Tai T Nguyen
(74) *Attorney, Agent, or Firm* — Patent Law Office of David G. Back

(57) ABSTRACT

A method and apparatus is provided for determining when a battery, or one or more batteries within a battery pack, undergoes an undesired thermal event such as thermal runaway. The system uses a conductive member mounted in close proximity to, or in contact with, an external surface of the battery or batteries to be monitored. A resistance measuring system such as a continuity-tester or an ohmmeter is coupled to the conductive member, the resistance measuring system outputting a first signal when the temperature corresponding to the battery or batteries is within a prescribed temperature range and a second signal when the temperature exceeds a predetermined temperature that falls outside of the prescribed temperature range.

22 Claims, 3 Drawing Sheets

BATTERY THERMAL EVENT DETECTION SYSTEM USING A THERMALLY INTERRUPTIBLE ELECTRICAL CONDUCTOR

FIELD OF THE INVENTION

The present invention relates generally to batteries and battery packs and, more particularly, to a system for detecting thermal events in a battery or battery pack.

BACKGROUND OF THE INVENTION

Batteries can be broadly classified into primary and secondary batteries. Primary batteries, also referred to as disposable batteries, are intended to be used until depleted, after which they are simply replaced with one or more new batteries. Secondary batteries, more commonly referred to as rechargeable batteries, are capable of being repeatedly recharged and reused, therefore offering economic, environmental and ease-of-use benefits compared to a disposable battery.

Although rechargeable batteries offer a number of advantages over disposable batteries, this type of battery is not without its drawbacks. In general, most of the disadvantages associated with rechargeable batteries are due to the battery chemistries employed, as these chemistries tend to be less stable than those used in primary cells. Due to these relatively unstable chemistries, secondary cells often require special handling during fabrication. Additionally, secondary cells such as lithium-ion cells tend to be more prone to thermal runaway than primary cells, thermal runaway occurring when the internal reaction rate increases to the point that more heat is being generated than can be withdrawn, leading to a further increase in both reaction rate and heat generation. Eventually the amount of generated heat is great enough to lead to the combustion of the battery as well as materials in proximity to the battery. Thermal runaway may be initiated by a short circuit within the cell, improper cell use, physical abuse, manufacturing defects, or exposure of the cell to extreme external temperatures.

Thermal runaway is of major concern since a single incident can lead to significant property damage and, in some circumstances, bodily harm or loss of life. When a battery undergoes thermal runaway, it typically emits a large quantity of smoke, jets of flaming liquid electrolyte, and sufficient heat to lead to the combustion and destruction of materials in close proximity to the cell. If the cell undergoing thermal runaway is surrounded by one or more additional cells as is typical in a battery pack, then a single thermal runaway event can quickly lead to the thermal runaway of multiple cells which, in turn, can lead to much more extensive collateral damage. Regardless of whether a single cell or multiple cells are undergoing this phenomenon, if the initial fire is not extinguished immediately, subsequent fires may be caused that dramatically expand the degree of property damage. For example, the thermal runaway of a battery within an unattended laptop will likely result in not only the destruction of the laptop, but also at least partial destruction of its surroundings, e.g., home, office, car, laboratory, etc. If the laptop is on-board an aircraft, for example within the cargo hold or a luggage compartment, the ensuing smoke and fire may lead to an emergency landing or, under more dire conditions, a crash landing. Similarly, the thermal runaway of one or more batteries within the battery pack of a hybrid or electric vehicle may destroy not only the car, but may lead to a car wreck if the car is being driven or the destruction of its surroundings if the car is parked.

One approach to overcoming this problem is by reducing the risk of thermal runaway. For example, to prevent batteries from being shorted out during storage and/or handling, precautions can be taken to ensure that batteries are properly stored, for example by insulating the battery terminals and using specifically designed battery storage containers. Another approach to overcoming the thermal runaway problem is to develop new cell chemistries and/or modify existing cell chemistries. For example, research is currently underway to develop composite cathodes that are more tolerant of high charging potentials. Research is also underway to develop electrolyte additives that form more stable passivation layers on the electrodes. Although this research may lead to improved cell chemistries and cell designs, currently this research is only expected to reduce, not eliminate, the possibility of thermal runaway. Accordingly, what is needed is a means for detecting thermal runaway events, and more preferably detecting a precursor to thermal runaway, thereby providing time to eliminate, or at least minimize, damage to adjacent cells and materials. The present invention provides such a means.

SUMMARY OF THE INVENTION

The present invention provides a method and apparatus for determining when a battery, or one or more batteries within a battery pack, undergoes an undesired thermal event such as thermal runaway. The system of the invention uses a conductive member mounted in close proximity to, or in contact with, an external surface of the battery or batteries to be monitored. A resistance measuring system such as a continuity-tester or an ohmmeter is coupled to the conductive member, the resistance measuring system outputting a first signal when the temperature corresponding to the battery or batteries is within a prescribed temperature range and a second signal when the temperature exceeds a predetermined temperature that falls outside of the prescribed temperature range.

In at least one embodiment of the invention, a battery thermal event detection system is provided comprised of a conductive member with a first end portion, a second end portion, and a region there between, wherein a portion of the region is proximate to an external surface of at least one battery. The system is further comprised of a resistance measuring system coupled to the first and second end portions of the conductive member, the resistance measuring system outputting a first signal when the battery is operating within a prescribed temperature range and a second signal when the temperature exceeds a predetermined temperature that falls outside of the prescribed temperature range. The system may be used with a single battery or multiple batteries. The conductive member may be elongated and cylindrically shaped. The conductive member may be comprised of a metal or comprised of a non-metallic material, e.g., a plastic, that contains a conductive material, e.g., carbon powder, carbon fiber, or metallic powder. The conductive member may be coated with an electrically non-conducting material or contained within an electrically non-conducting tube. The conductive member may be held in place with bonding/potting material, mechanical clips, or other means. The conductive member may be severed when the battery temperature exceeds the predetermined temperature, or the resistance of the conductive member may vary between a first resistance when the battery is operating within the prescribed temperature range and a second resistance when the battery exceeds the predetermined temperature. The resistance measuring system may be comprised of a continuity-tester or an ohmmeter. The system may include a system controller coupled to the resistance measuring system, the system controller providing a response when a thermal event is detected. System controller responses may include activating a warning indicator, activating a battery cooling system, activating a fire control system, and transmitting a thermal event notification report.

In at least one embodiment of the invention, a battery thermal event detection system is provided comprised of a plurality of batteries, a first conductive member proximate to each battery of a first subset of the batteries and a second conductive member proximate to each battery of a second subset of the batteries, a first resistance measuring system coupled to the first conductive member and a second resistance measuring system coupled to the second conductive member. The first and second resistance measuring systems may be multiplexed.

In at least one embodiment of the invention, a method of detecting a battery thermal event is provided, the method comprising the steps of positioning a conductive member in proximity to the external surface of at least one battery, determining continuity of the conductive member where continuity is severed when the battery temperature exceeds a predetermined temperature, and outputting to a system controller a first signal when the conductive member exhibits continuity and a second signal when continuity is severed.

In at least one embodiment of the invention, a method of detecting a battery thermal event is provided, the method comprising the steps of positioning a conductive member in proximity to the external surface of at least one battery, measuring the resistance of the conductive member where the measured resistance is within a first range of resistivities when the battery temperature is within a prescribed temperature range and within a second range of resistivities when the battery temperature exceeds a predetermined temperature, and outputting to a system controller a first signal when the resistance is within the first range of resistivities and a second signal when the resistance is within the second range of resistivities.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The term "electric vehicle" as used herein refers to all-electric vehicles, hybrid electric vehicles and plug-in hybrid vehicles. Lastly, identical element symbols used on multiple figures refer to the same component, or components of equal functionality.

As illustrated and described below, the present invention provides a means of determining whether the monitored temperature of one or more batteries exceeds a predetermined temperature, the predetermined temperature falling outside of a desired and preferred operating range. In accordance with the invention, the predetermined temperature is preferably selected to indicate either that the battery or batteries in question are undergoing thermal runaway, or that they are exceeding the maximum temperature expected during normal operation and storage, either of these conditions also being referred to herein as a "thermal event".

Figure 1:
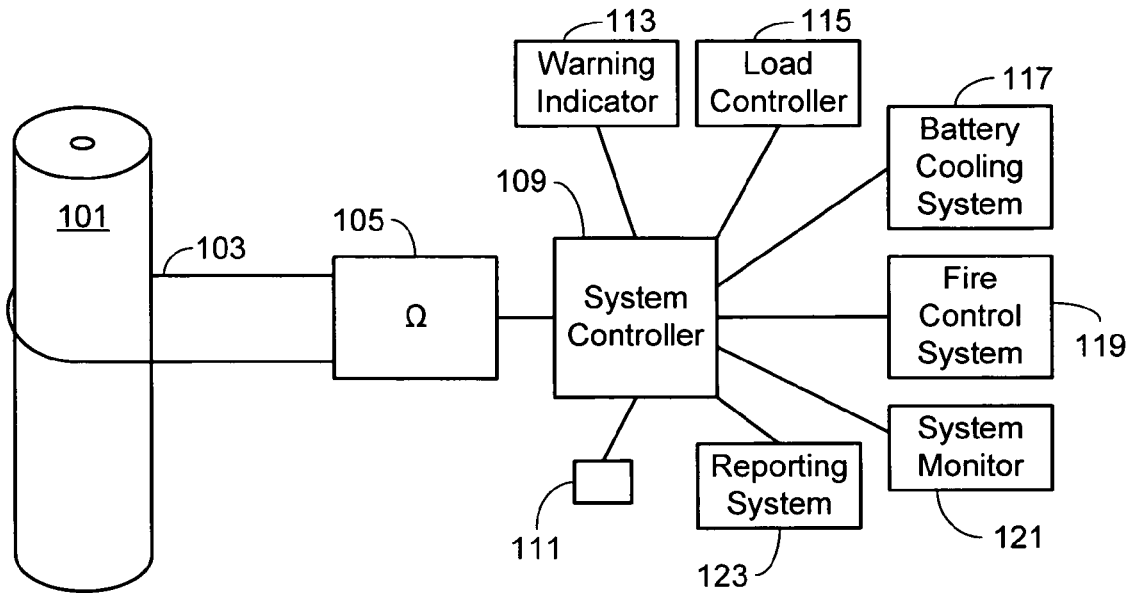
FIG. 1 illustrates a basic embodiment of the invention utilizing a conductive member in close proximity to, or in contact with, a single battery.
Figure 2:
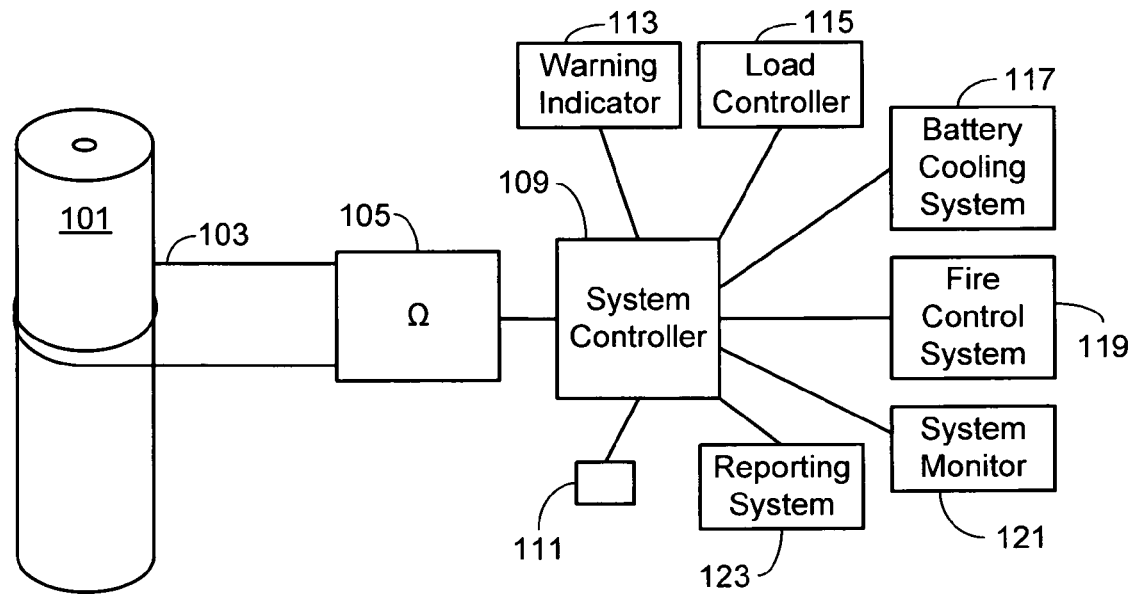
FIG. 2 illustrates an alternate embodiment in which a conductive member is wrapped around a battery one or more times.

FIG. 1 illustrates the basic inventive concept as well as the simplest embodiment of the invention. In this embodiment, the health of a single battery 101 is monitored although as noted below, the inventors consider the primary application for the invention to be monitoring a plurality of batteries, for example the batteries within a battery pack. The monitoring system consists of an electrically conductive member 103 in close proximity to, or in contact with, an external surface of battery 101. In at least one preferred embodiment, conductive member 103 is cylindrical and elongated (e.g., a wire) formed of a suitable material as described further below. In at least one preferred embodiment, the external surface of the battery selected to be in contact with, or proximate to, the conductive member is the venting region of the battery, thus insuring that the conductive member is exposed to extreme heat during a thermal runaway event. Conductor 103 may only be proximate to, or in contact with, a relatively small portion of battery 101 as shown in FIG. 1, or it may be wrapped around battery 101 one or more times as illustrated in FIG. 2. Coupled to electrically conductive member 103 is a resistance measuring system 105. As described further below, in some embodiments resistance measuring system 105 is comprised of an ohmmeter while in other embodiments resistance measuring system 105 is comprised of a simple continuity-tester. As both ohmmeters and continuity-testers are well known by those of skill in the art, further description will not be provided herein.

In some embodiments of the invention, if battery 101 becomes too hot, for example due to battery shorting or other malfunction, conductor 103 melts, severing the conductive path formed by the conductive member. In this situation either an ohmmeter or a continuity-tester can be used to indicate the occurrence of the thermal event. In other embodiments of the invention, the system is designed to take advantage of the temperature dependence of the electrical resistance associated with many typical conductors, preferably the resistance varying in accordance with a predetermined resistance/temperature profile. In these embodiments, system 105 is comprised of an ohmmeter, thus allowing detection of both thermal events and thermal event precursors, i.e., temperatures that are greater than desired, but still below those indicative of a battery thermal event.

Coupled to resistance measuring system 105 is a system controller 109. As the output of system 105 varies with the resistance/continuity of conductor 103, by monitoring the output of system 105, system controller 109 can determine when an excessive cell temperature has been reached. As previously noted, the conductivity of conductor 103 can be used as a simple on-off switch, i.e., cell 101 can be assumed to be in good thermal health as long as system 105 indicates that conductor 103 is in tact and is still conductive. Once system 105 indicates that conductor 103 is no longer conductive, it can be assumed that cell 101 is undergoing a thermal event. Alternately, a thermal event may be indicated by an abrupt or excessive change in resistance. Alternately, a thermal event may be indicated by the measured resistance of conductor 103, the conductor's resistance following a predetermined resistance/temperature profile.

Since resistance measuring system 105 is coupled to system controller 109 as shown, system 105 can be used to either continuously monitor conductor 103 or monitor it intermittently, thereby conserving system power. For example, resistance measuring system 105 can be programmed to test at a preset frequency (e.g., once every five seconds), or only under certain circumstances (e.g., when the battery or batteries are under load conditions). In at least one embodiment, system controller 109 is coupled to one or more temperature monitors 111, temperature monitor(s) 111 monitoring ambient battery/battery pack temperature. As the likelihood of a battery undergoing thermal runaway and the risk of such an event spreading to other cells increases with increased ambient temperature, this information can be used, for example, to increase the frequency at which the health of a battery is monitored using the thermal monitoring system of the invention.

Once an excessive rise in temperature has been detected by the system of the invention, system controller 109 can be programmed to perform any of a variety of responses. It will be appreciated that the system can be programmed to perform either single or multiple responses, and in the latter case the responses can be performed serially or in parallel. Although there are any number of possible responses, in general the response is governed by the application in question. For example, a suitable response for the batteries contained in a laptop may be quite different from the response for the batteries in an electric vehicle. Exemplary responses include:

A warning indicator 113 may be coupled to system controller 109 that provides a visual or audible indicator, or both, of a detected battery thermal event. For example, in an electric vehicle, indicator 113 may be an indicator light mounted in an instrument cluster on the dashboard and/or a sound generator coupled to, or separate from, the vehicle's audio system.

System controller 109 may be coupled to means 115 for modifying the load on the battery or batteries. If the thermal event detected by the system is a precursor to thermal runaway, eliminating or at least reducing the load may prevent further increases in battery temperature, thereby possibly preventing battery thermal runaway. Means 115 also helps to achieve a controlled shut-down of the devices/applications powered by the battery or batteries in question. Typically means 115 is a control circuit used to control and couple the power from the battery(s) to the device/application.

An emergency battery cooling system 117 may be coupled to system controller 109, system 117 being activated when a thermal event is detected, thus helping to reduce the temperature of the battery or batteries exhibiting increased temperature. Preferably cooling system 117 is in addition to any cooling system routinely used to control the temperature of the battery(s). Alternately, activation of cooling system 117 may simply increase the cooling capacity of an already operating cooling system. The purpose of cooling system 117 is to try and prevent thermal runaway from occurring if the monitored thermal event is a precursor to thermal runaway, and if thermal runaway is already occurring, prevent its propagation to neighboring cells. Cooling system 117 may be comprised of either a liquid or gas based cooling system.

An emergency fire extinguishing system 119 may be coupled to system controller 109. It will be appreciated that when a battery undergoes thermal runaway, the temperatures are sufficient to cause the combustion of cell materials and/or materials in proximity to the affected cells. Accordingly the purpose of fire extinguishing system 119 is to contain any such fire and prevent it from spreading to adjacent components/materials. Fire extinguishing system 119 may be either liquid or gas based.

In a battery pack containing a large number of cells, the system may be designed to continue operation even after one or more cells have ceased operation due to a thermal runaway event. Accordingly, in at least one embodiment system controller 109 is coupled to an event recording system 121, system 121 preferably recording the time and date of the thermal event. A record of thermal events can later be used to determine potential battery failure mechanisms, for example by noting the demands being placed on the battery-powered device/application at the time of failure or the ambient temperature at the time of failure. Additionally, this information can be used to diagnose other, related issues with the battery-powered device/application. For example, if the malfunctioning battery is part of an electric vehicle's battery pack, a record of this thermal event can be used to diagnose an exhibited loss of vehicle power, charging problems, etc. System 121 may be integrated within system controller 109, or separate from system controller 109, e.g., integrated within a device controller.

In at least one embodiment, system controller 109 is coupled to an on-board communication system 123 that reports thermal events to a user and/or service provider via a communication network such as cellular, internet, satellite or other network (not shown). This system allows the end user to be notified of a problem even if they are not in close proximity to the battery-powered device/application. Alternately, the system can be used to notify a pre-selected service company that a thermal event has been monitored that will require servicing. Alternately, the system can be used to notify an emergency service provider, for example a towing/repair service if the battery-powered device in question is an electric vehicle. Exemplary vehicle communication systems are given in co-pending U.S. patent application Ser. No. 11/818,838, filed Jun. 15, 2007 and Ser. No. 11/779,678, filed Jul. 18, 2007, the disclosures of which are incorporated herein for any and all purposes.

In general, the composition of conductor 103 is based on its melting point, the desired melting point being indicative of the thermal event in question which, in turn, is based on the operating and thermal characteristics of the battery to be monitored. Alternately the composition of conductor 103 can be selected to achieve the desired variation in resistance as a function of temperature and within an appropriate temperature regime. Exemplary conductors 103 may be fabricated from a solder or other metal/metal alloy with a suitable melting point. Alternately, conductor 103 can be fabricated from plastic (e.g., polymer) or other non-metallic material that has been doped, embedded, or otherwise formed such that it contains a conductive material (e.g., carbon powder/fibers, metallic powder, etc.).

In at least one preferred embodiment of the invention, conductive member 103 is coated or otherwise covered with a non-conductive material. Coating member 103 with an electrically non-conducting material helps to minimize the risk that when conductor 103 melts, a conductive path remains, for example due to the two ends of the melted region coming into contact with an electrically conductive material, e.g., a metal battery casing. In an alternate approach, conductor 103 is contained within a thermally conductive, electrically non-conducting, tube. Preferably the electrically non-conducting tube has a much higher melting point than conductor 103, thus ensuring that when conductor 103 melts the melted region remains within the tube and does not contact an electrically conductive material. In an alternate approach, member 103 is placed under tension using a simple spring arrangement or similar means. By keeping member 103 under tension, when member 103 melts, the two ends of the melted region are pulled apart, thereby ensuring that conductor 103 continuity is broken when member 103 melts.

Figure 3:
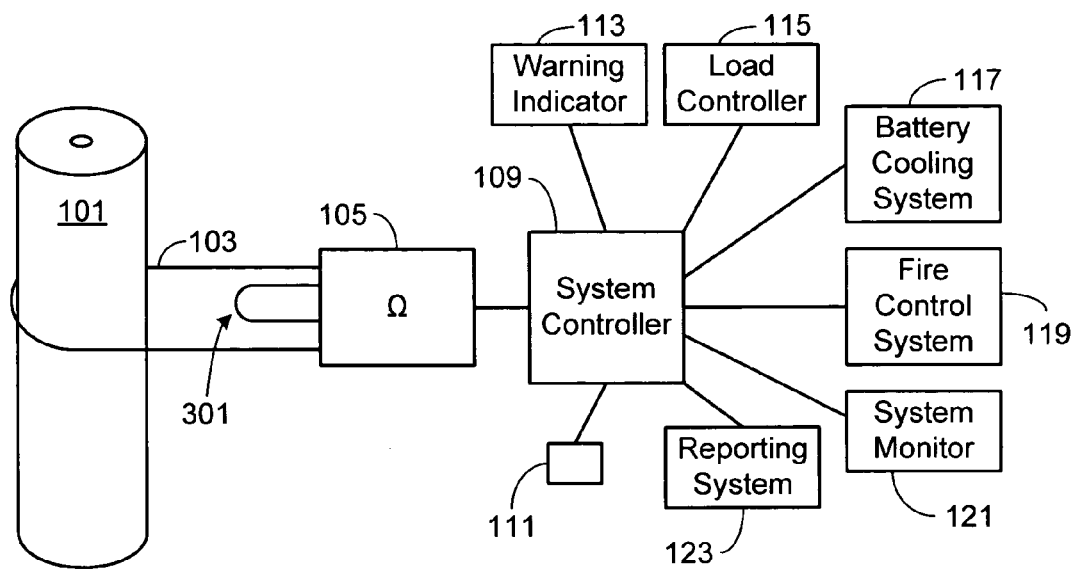
FIG. 3 illustrates an alternate embodiment that includes means for verifying that the resistance measuring system is operating properly.

For some applications of the invention, system controller 109 responds in a predetermined manner even if there is a chance that the monitored thermal event is a false event, for example due to a malfunction with resistance measuring system 105. In other applications, however, it is desirable to minimize the risk of false event reporting. One approach of minimizing false event reporting is to include redundant systems, thus requiring both systems to detect a thermal event prior to responding. Alternately, and as illustrated in FIG. 3, system controller 109 can periodically direct resistance measuring system 105 to test a known conductive member 301 that is separate from member 103 and protected from possible battery thermal events. In addition to providing validation that resistance measuring system 105 is functioning properly, testing a member 301 that has a known resistance, i.e., a calibration member, can also be used to periodically re-calibrate testing system 105. Controller 109 can be programmed to cause resistance measuring system 105 to test member 301 in-between testing member 103; alternately, member 301 can be tested upon start-up of the device powered by battery 103; alternately, member 301 can be tested after a thermal event has been detected but before controller 109 responds; alternately, member 301 can be tested following some other schedule.

Figure 4:
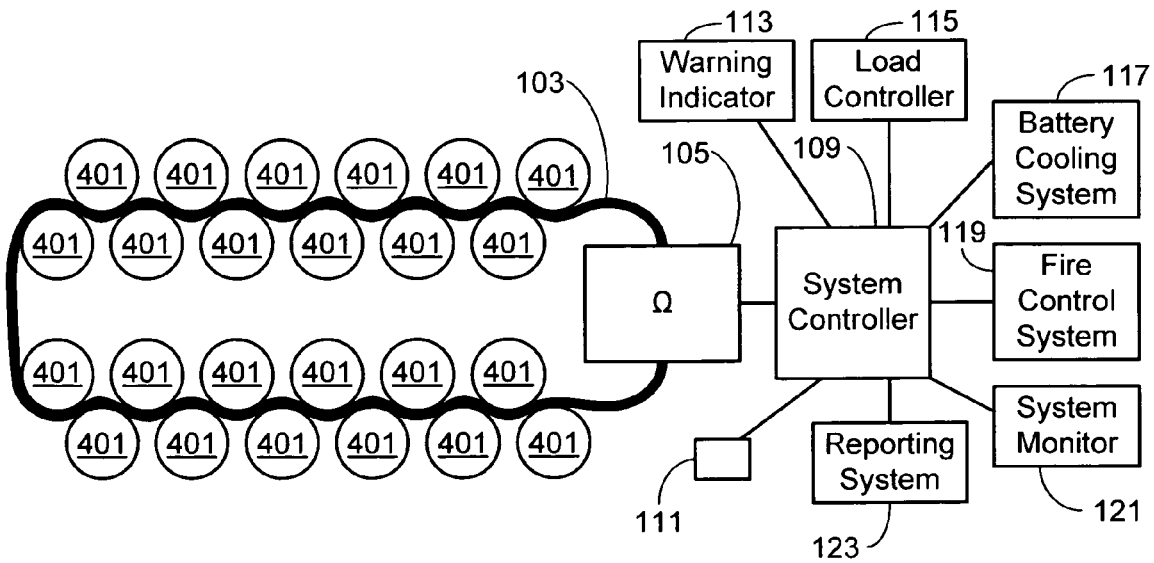
FIG. 4 illustrates an embodiment coupled to a plurality of batteries.

As previously noted, although the invention can be used to monitor for thermal events associated with a single battery, preferably it is used to monitor the health of a large number of batteries, for example within a battery pack. FIG. 4 illustrates one such configuration. It should be understood that all of the aspects described above relative to FIGS. 1-3 and single cell monitoring are equally applicable to multi-cell monitoring.

As shown in FIG. 4, conductive member 103 passes in close proximity to, or in contact with, a portion of the external surface of a plurality of batteries 401. In this embodiment, when the temperature of any single cell exceeds the thermal event threshold of the system, the change is detected by resistance measuring system 105 which, in turn, sends a notification signal to system controller 109.

It will be appreciated that any number of different techniques can be used to ensure that member 103 is in contact with, or close enough proximity to, the cells. For example, cells 401 may be packed close enough together that member 103 is pressed against the external surface of each cell when the member is positioned between the cells. Alternately, a potting compound can be used to hold the cells in place as well as the conductor 103 relative to the cells. Alternately, a simple clip or other mechanical attachment means can be used to position member 103 relative to the cells. Alternately, conductor 103 may be bonded to the cells, for example using a thermally conductive adhesive. Regardless of the technique used to hold the conductive member against or next to the cells, the technique must continue to function as the temperature of a cell increases, thus insuring that the conductor does not change position as the cell temperature approaches the predetermined temperature associated with the thermal event. Thus, for example, if an adhesive is used, preferably it has a higher melting point than member 103 in order to keep member 103 positioned as desired.

Figure 5:
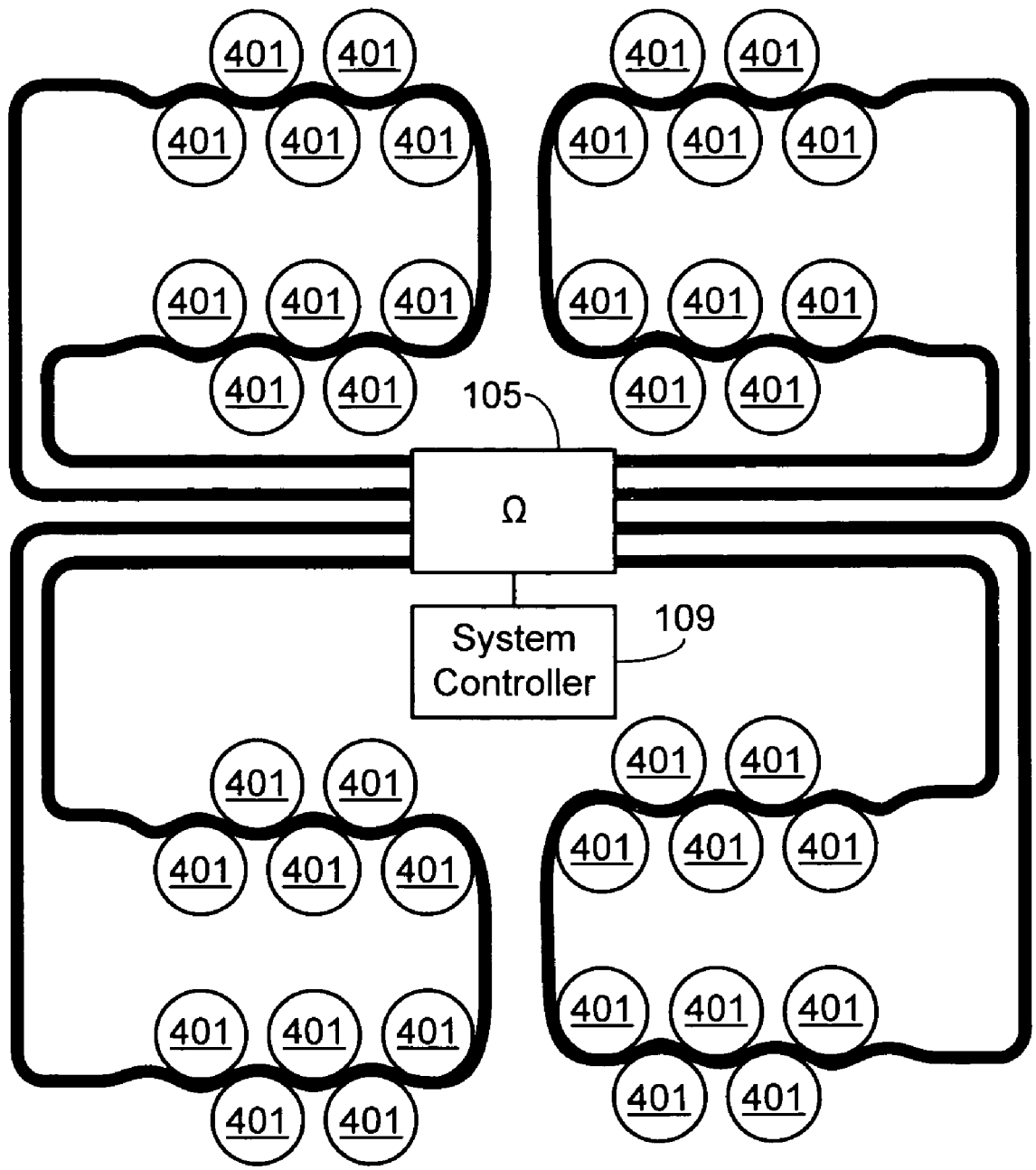
FIG. 5 illustrates an embodiment coupled to a plurality of battery subsets, the battery subsets associated with a single battery pack.

Although a single conductive member may be used to monitor the health of some or all of the batteries of a battery pack, in at least one embodiment of the invention the battery pack is divided into multiple groups of cells, each group comprised of a plurality of cells as shown in FIG. 5. In the exemplary embodiment shown in FIG. 5, the battery pack is divided into four battery subsets. It will be appreciated that a battery pack utilizing the invention may be divided into more or less cell groupings, and that each group may contain more or less cells than shown in the exemplary embodiment. In the illustrated embodiment, a single resistance measuring system 105 is multiplexed with members 501-504. Alternately, each battery subset can use a dedicated resistance measuring system (not shown).

Depending upon the size of the battery pack to be monitored, dividing the pack into multiple cell groups, each of which is individually monitored, offers a number of benefits. First, it allows an affected battery group of the pack to be identified and then decoupled from the battery pack, and thus decoupled from the device and/or application being powered by the battery pack. Decoupling the affected subset of the battery pack, in some configurations, allows the battery-powered device/application to continue to operate, albeit at reduced power. Second, dividing the battery pack into cell subsets allows specific measures to be taken for the affected subset only, measures such as additional cooling and/or deployment of fire retardants, etc. Third, individually monitoring battery subsets simplifies diagnostics and repair, as the affected cells are identified. Fourth, identifying a battery pack subset that is experiencing a thermal event allows measures such as increased cooling to be applied to nearby subsets, thus decreasing the possibility of the thermal event propagating throughout the battery pack.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A detection system for detecting a battery thermal event, the detection system comprising:
   at least one battery;
   a conductive member comprised of a first end portion, a second end portion, and a region there between, wherein a portion of said region is proximate to an external surface of said at least one battery;
   a resistance measuring system coupled to said first and second end portions of said conductive member, wherein said resistance measuring system outputs a first signal when said at least one battery is operating within a prescribed temperature range and outputs a second signal when a temperature corresponding to said at least one battery exceeds a predetermined temperature, wherein said predetermined temperature is outside of said prescribed temperature range; and a system controller coupled to said resistance measuring system, wherein said system controller performs a predetermined response when said system controller receives said second signal from said resistance measuring system, said predetermined response selected from the group of responses consisting of (i) activating a warning indicator, (ii) activating a battery cooling system, (iii) activating a fire control system, and/or (iv) transmitting a thermal event notification report via a communication system coupled to said system controller.

2. The detection system of claim 1, wherein said at least one battery corresponds to one battery of a plurality of batteries, wherein said region of said conductive member is proximate to each of said plurality of batteries, and wherein said resistance measuring system outputs said second signal when a battery temperature corresponding to any of said plurality of batteries exceeds said predetermined temperature.

3. The detection system of claim 1, wherein said conductive member is elongated and cylindrically shaped.

4. The detection system of claim 1, wherein said resistance measuring system is comprised of a continuity-tester.

5. The detection system of claim 1, wherein said conductive member is severed when said temperature corresponding to said at least one battery exceeds said predetermined temperature.

6. The detection system of claim 1, wherein said resistance measuring system is comprised of an ohmmeter.

7. The detection system of claim 1, wherein a resistance corresponding to said conductive member and monitored by said resistance measuring system is within a first range of resistivities when said at least one battery is operating within said prescribed temperature range and within a second range of resistivities when said temperature corresponding to said at least one battery exceeds said predetermined temperature.

8. The detection system of claim 1, wherein said conductive member is comprised of a metal.

9. The detection system of claim 1, wherein said conductive member is comprised of a non-metallic material that contains a conductive material.

10. The detection system of claim 9, wherein said non-metallic material is comprised of a plastic.

11. The detection system of claim 9, wherein said metallic material is selected from the group consisting of carbon powders, carbon fibers and metallic powder.

12. The detection system of claim 1, wherein said conductive member is in contact with said external surface of said at least one battery.

13. The detection system of claim 1, further comprising a bonding material, said bonding material holding said conductive member in place relative to said at least one battery.

14. The detection system of claim 1, further comprising a mechanical clip, said mechanical clip holding said conductive member in place relative to said at least one battery.

15. The detection system of claim 1, wherein said conductive member is coated with an electrically non-conducting material.

16. The detection system of claim 1, further comprising an electrically non-conducting tube, wherein said region of said conductive member is contained within said electrically non-conducting tube.

17. The detection system of claim 1, further comprising a second conductive member, wherein said resistance measuring system is intermittently coupled to said second conductive member to validate resistance measuring system operation.

18. The detection system of claim 1, further comprising a calibration member, wherein said resistance measuring system is intermittently coupled to said calibration member to calibrate operation of said resistance measuring system.

19. A detection system for detecting a battery thermal event, the detection system comprising:
  a plurality of batteries;
  a first conductive member proximate to each battery of a first subset of said plurality of batteries;
  a second conductive member proximate to each battery of a second subset of said plurality of batteries;
  a first resistance measuring system coupled to said first conductive member, wherein said first resistance measuring system outputs a first thermal event notification signal when a first temperature associated with at least one battery of said first subset of said plurality of batteries exceeds a predetermined temperature;
  a second resistance measuring system coupled to said second conductive member, wherein said second resistance measuring system outputs a second thermal event notification signal when a second temperature associated with at least one battery of said second subset of said plurality of batteries exceeds said predetermined temperature; and
  a system controller coupled to said first and second resistance measuring systems, wherein said system controller performs a predetermined response when said system controller receives either said first thermal event notification signal from said first resistance measuring system or said second thermal event notification signal from said second resistance measuring system, said predetermined response selected from the group of responses consisting of (i) activating a warning indicator, (ii) activating a battery cooling system, (iii) activating a fire control system, and/or (iv) transmitting a thermal event notification report via a communication system coupled to said system controller.

20. The detection system of claim 19, wherein a multiplexed resistance measuring system comprises said first and second resistance measuring systems.

21. A method for detecting a battery thermal event, the method comprising steps of:
  positioning a conductive member in proximity to an external surface of at least one battery;
  determining continuity of said conductive member, wherein continuity is severed when a battery temperature corresponding to said at least one battery exceeds a predetermined temperature;
  outputting a first signal to a system controller when said conductive member exhibits continuity during said determining step; outputting a second signal to said system controller when continuity of said conductive member is severed indicating said battery temperature corresponding to said at least one battery has exceeded said predetermined temperature and
  performing a predetermined response when said system controller receives said second signal, said predetermined response selected from the group of responses consisting of (i) activating a warning indicator, (ii) activating a battery cooling system, (iii) activating a fire control system, and/or (iv) transmitting a thermal event notification report via a communication system coupled to said system controller.

22. A method for detecting a battery thermal event, the method comprising steps of:

positioning a conductive member in proximity to an external surface of at least one battery;

measuring a resistance corresponding to said conductive member, wherein said resistance is within a first range of resistivities when a battery temperature corresponding to said at least one battery is within a prescribed temperature range, and wherein said resistance is within a second range of resistivities when said battery temperature exceeds a predetermined temperature, wherein said predetermined temperature is outside of said prescribed temperature range;

outputting a first signal to a system controller when said resistance is within said first range of resistivities;

outputting a second signal to said system controller when said resistance is within said second range of resistivities; and performing a predetermined response when said system controller receives said second signal, said predetermined response selected from the group of responses consisting of (i) activating a warning indicator, (ii) activating a battery cooling system, (iii) activating a fire control system, and/or (iv) transmitting a thermal event notification report via a communication system coupled to said system controller.

* * * * *